(12) United States Patent
Savage et al.

(10) Patent No.: US 11,391,362 B2
(45) Date of Patent: Jul. 19, 2022

(54) OIL PUMP RECEIVING BORE LIP

(71) Applicant: Textron Innovations Inc., Providence, RI (US)

(72) Inventors: Amanda Christine Savage, Euless, TX (US); Charles Hubert Speller, Flower Mound, TX (US)

(73) Assignee: Textron Innovations Inc., Providence, RI (US)

( * ) Notice: Subject to any disclaimer, the term of this patent is extended or adjusted under 35 U.S.C. 154(b) by 23 days.

(21) Appl. No.: 16/861,069

(22) Filed: Apr. 28, 2020

(65) Prior Publication Data

US 2021/0332879 A1 Oct. 28, 2021

(51) Int. Cl.
*F16H 57/04* (2010.01)
*B64C 27/14* (2006.01)
*F04C 2/10* (2006.01)
*F16H 57/02* (2012.01)

(52) U.S. Cl.
CPC ......... *F16H 57/0436* (2013.01); *B64C 27/14* (2013.01); *F04C 2/10* (2013.01); *F16H 57/02* (2013.01); *F16H 57/0441* (2013.01); *F04C 2210/14* (2013.01)

(58) Field of Classification Search
CPC ..... B24C 27/14; F16H 57/0436; F16H 57/02; F16H 57/0441; F04C 2/10; F04C 2210/14
See application file for complete search history.

(56) References Cited

U.S. PATENT DOCUMENTS

| | | | |
|---|---|---|---|
| 8,556,577 B2* | 10/2013 | Bell | F04C 15/0061 |
| | | | 415/122.1 |
| 9,441,628 B2* | 9/2016 | Sakata | F04C 15/0096 |
| 2014/0001307 A1 | 1/2014 | Ehinger et al. | |
| 2014/0086766 A1* | 3/2014 | Chikaoka | H02K 29/03 |
| | | | 310/156.01 |

* cited by examiner

*Primary Examiner* — Thomas C Diaz
(74) *Attorney, Agent, or Firm* — Shackelford, Bowen, McKinley & Norton, LLP

(57) ABSTRACT

A gearbox system for a rotorcraft includes a gearbox housing, an oil pump receiving bore formed into the gearbox housing and having formed therein a first opening having a first diameter and a second opening, and an oil pump positioned within the oil pump receiving bore. The second opening is bounded by a lip that extends radially into the second opening, the second opening having a second diameter that is smaller than the first diameter.

20 Claims, 3 Drawing Sheets

OIL PUMP RECEIVING BORE LIP

TECHNICAL FIELD

The present disclosure relates generally to oil pumps and more particularly, but not by way of limitation, to an oil pump receiving bore for a rotorcraft gearbox.

BACKGROUND

This section provides background information to facilitate a better understanding of the various aspects of the disclosure. It should be understood that the statements in this section of this document are to be read in this light, and not as admissions of prior art.

A helicopter may include one or more rotor systems, such as a main rotor system. A main rotor system generates aerodynamic lift to support the weight of the helicopter in flight and thrust to counteract aerodynamic drag and move the helicopter in forward flight. Another example of a helicopter rotor system is a tail rotor system. A tail rotor system is used to generate thrust in the same direction as the main rotor system's rotation to counter the torque effect created by the main rotor system. Rotor systems typically include a gearbox that transmits energy from a power source (e.g., an engine) to rotor blades of the rotor systems. Gearboxes include a lubrication system to provide lubricant to components of the gearbox to reduce friction and heat within the gearbox.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of an oil pump system includes an oil pump receiving bore with a first opening having a first diameter and a second opening having a second diameter that is smaller than the first diameter and an oil pump positioned within the oil pump receiving bore.

An example of a gearbox system for a rotorcraft includes a gearbox housing, an oil pump receiving bore formed into the gearbox housing and having formed therein a first opening having a first diameter and a second opening, and an oil pump positioned within the oil pump receiving bore. The second opening is bounded by a lip that extends radially into the second opening, the second opening having a second diameter that is smaller than the first diameter.

An example of a method of installing an oil pump into a rotorcraft gearbox includes: inserting a snap ring into a beveled groove formed into a wall of an oil pump receiving bore of the rotorcraft gearbox, the oil pump receiving bore having formed therein a first opening having a first diameter and a second opening having a second diameter that is smaller than the first diameter; inserting a retaining cap into the oil pump receiving bore such that the retaining cap abuts the snap ring; inserting an oil pump into the oil pump receiving bore; attaching a cover plate to the oil pump receiving bore. When in the installed position, the oil pump abuts the cover plate and the retaining cap.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
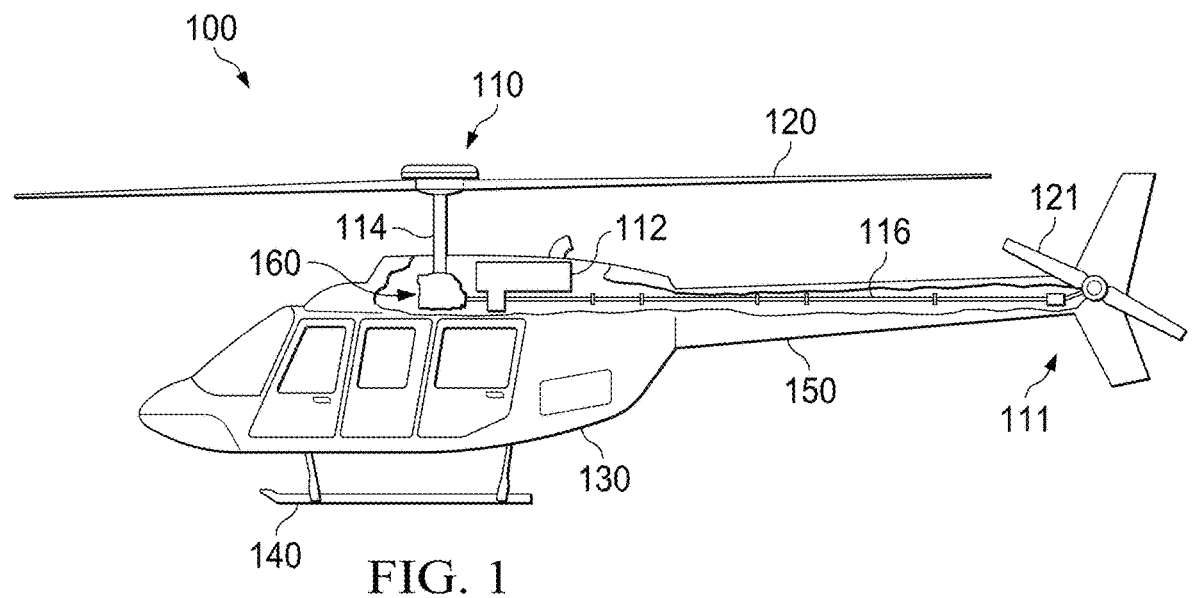
FIG. 1 is a side view of a rotorcraft according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1 illustrates a rotorcraft 100 according to aspects of the disclosure. Rotorcraft 100 includes a main rotor system 110 with rotor blades 120, a tail rotor system 111 with rotor blades 121, a fuselage 130, a landing gear 140, and an empennage 150. Rotorcraft 100 also includes an engine 112, a gearbox 160, a mast 114, and a tail rotor drive shaft 118. Engine 112 supplies torque to mast 114 via a gearbox 160 for rotating of rotor blades 120. Engine 112 also supplies torque to tail rotor drive shaft 116 for rotating rotor blades 121. In the example of FIG. 1, gearbox 160 is a main rotor transmission system. Main rotor system 110 may include a control system for selectively controlling the pitch of each rotor blade 120 in order to selectively control direction, thrust, and lift of rotorcraft 100. It should be appreciated that some of the teachings from rotorcraft 100 may apply to aircraft other than rotorcraft, such as airplanes, tilt rotors, unmanned aircraft, to name a few examples. In addition, teachings of certain embodiments relating to rotor systems described herein may apply to main rotor system 110, tail rotor system 111, and/or other rotor systems, including but not limited to non-helicopter rotor systems.

As stated above, gearbox 160 may transmit torque from engine 112 to main rotor system 110 and tail rotor system 111. Gearbox 160 may be a variable-speed gearbox that changes the speed and torque of engine 112. A variable-speed transmission is a gearbox that can be "shifted" to dynamically change the speed-to-torque ratio. Gearboxes typically include gears, bearings, and other mechanical components that are subject to wear and heat generation due to contact with other components. To reduce wear and heat generation, gearboxes are lubricated with a lubricant that reduces friction and transfers heat away from the components.

Figure 2:
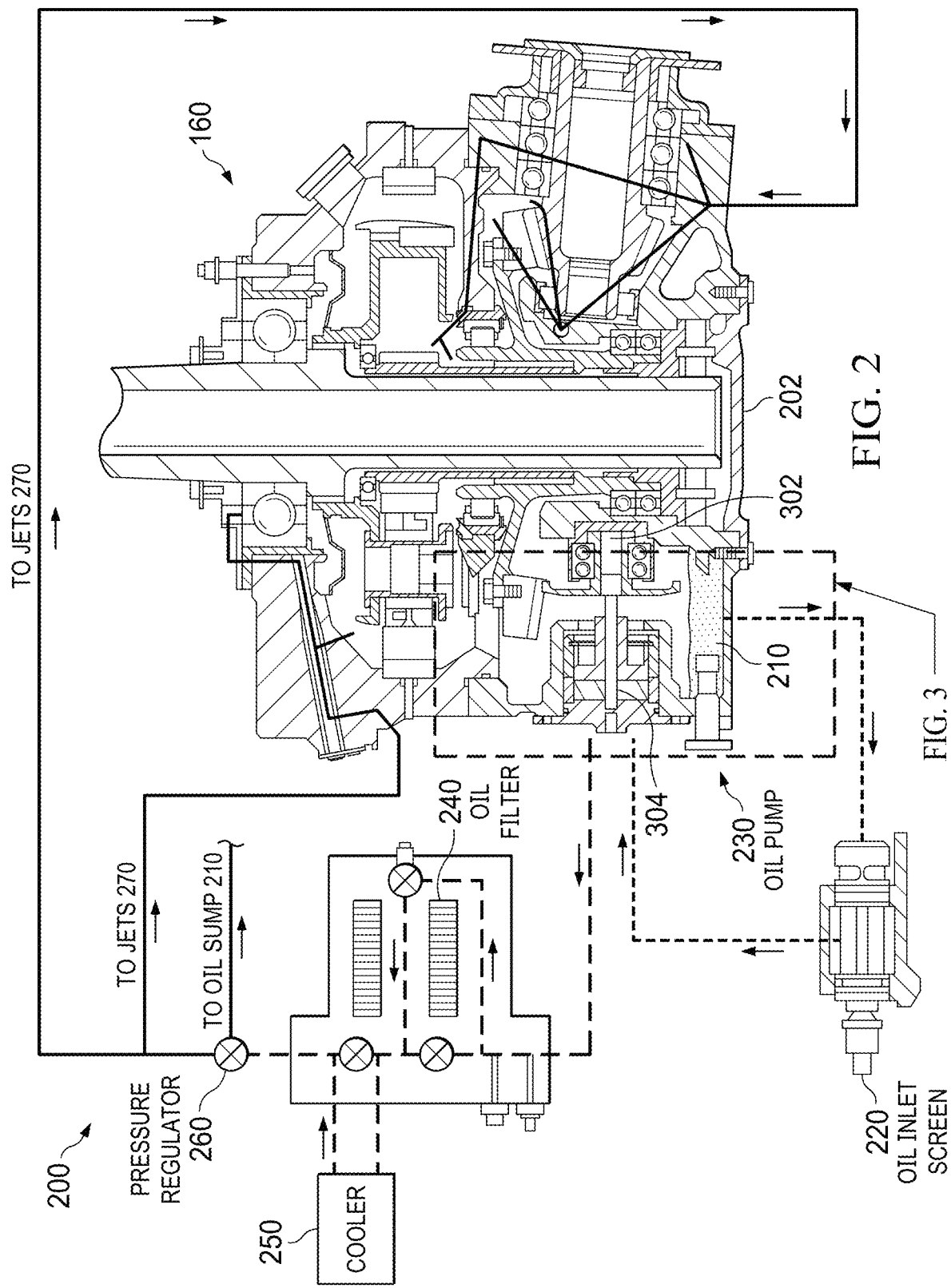
FIG. 2 is a sectioned view of a gearbox for a rotorcraft according to aspects of the disclosure.

FIG. 2 illustrates a lubrication system 200 for gearbox 160 according to aspects of the disclosure. Lubrication system 200 includes a lubricant sump 210, a lubricant inlet screen 220, a pump 230, a filter 240, a lubricant cooler 250, a pressure regulator 260, and jets 270. Other embodiments of lubrication system 200 may contain more, fewer, or different components. Embodiments of lubrication system 200 may be pressurized or unpressurized. For example, jets 270 may dispense either pressurized or unpressurized lubricant to components of gearbox 160.

Lubricant sump 210 is a reservoir that stores lubricant (e.g., oil) within lubrication system 200. Lubricant sump 210 may be integral with a gearbox housing 202 of gearbox 160 (as shown in FIG. 2) or may be separate from gearbox housing 202. Lubricant inlet screen 220 is a filter that removes large particulates from the lubricant before the lubricant enters pump 230. Pump 230 circulates lubricant throughout lubrication system 200. Pump 230 may include, for example, a gerotor. Filter 240 removes small contaminants from the lubricant after the lubricant has been pressurized by pump 230. Lubricant cooler 250 lowers the temperature of the lubricant before the lubricant is applied to the various components of gearbox 160. Pressure regulator 260 continuously flows oil to lubricant sump 210 and regulates pressure by diverting excess flow to lubricant sump 210. Jets 270 are positioned throughout gearbox 160 to dispense lubricant on components of gearbox 160 that are subject to friction and/or generate heat, such as gears and bearings.

Figure 3:
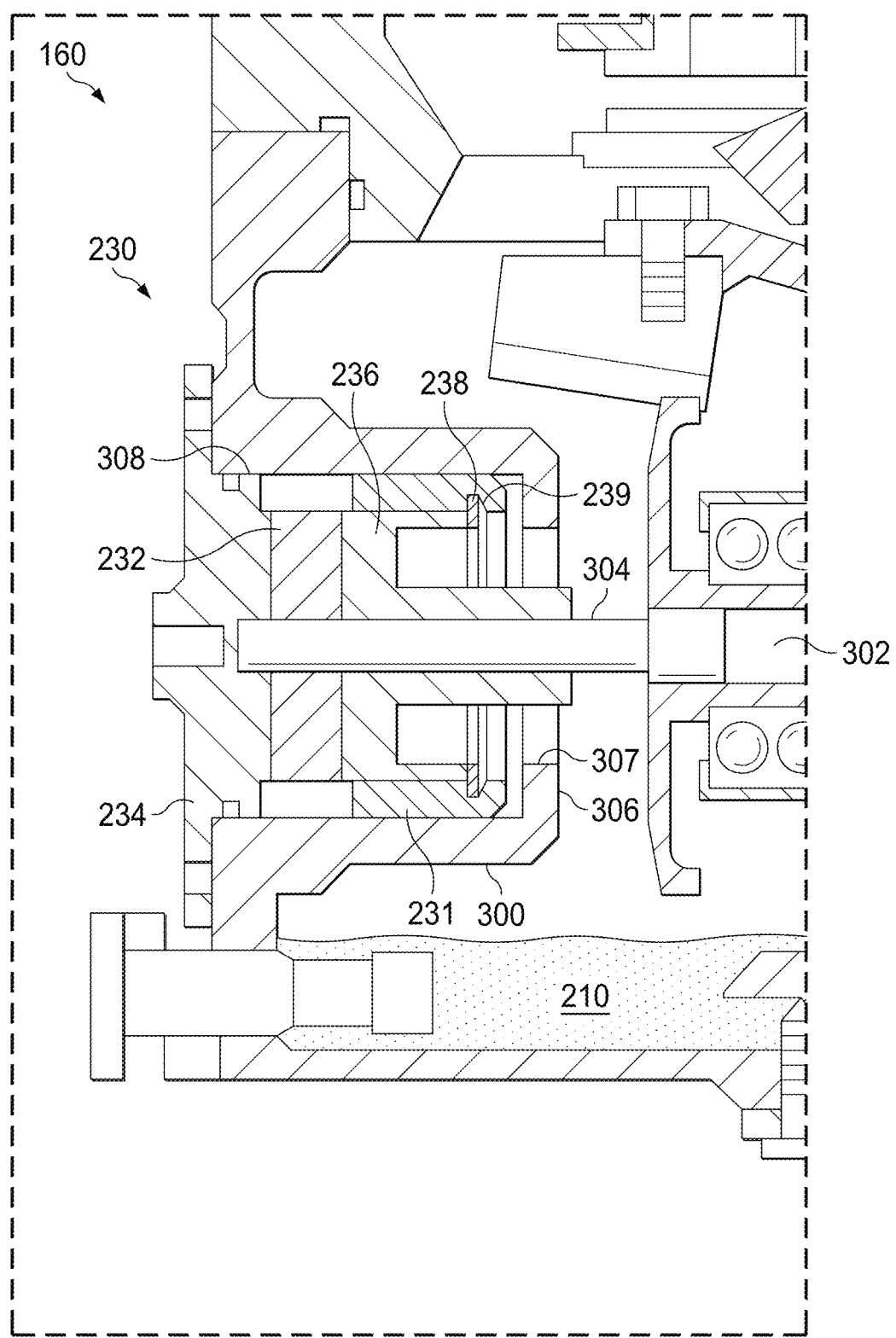
FIG. 3 is a detail view of an oil pump receiving bore of the gearbox of FIG. 2.

FIG. 3 is a detail view of pump 230 installed in gearbox 160 according to aspects of the disclosure. Pump 230 is installed in an oil pump receiving bore 300 of gearbox 160 and is held in place by a plurality of fasteners that engage gearbox housing 202. Oil pump receiving bore 300 comprises a cylindrical shape that complements the shape of pump 230. Pump 230 incudes a housing 231 that houses a gerotor unit 232 and a cover 236. Housing 231 includes a mounting plate 234 that facilitates the mounting of oil pump 230 to gearbox 160. For example one or more fasteners may be inserted through openings of mounting plate 234 and threaded into corresponding threaded bores that are formed into gearbox housing 202. Gerotor unit 232 is coupled to a shaft 304 that is driven by a shaft 302 of gearbox 160. Cover 236 helps support and position gerotor unit 232 within housing 231 and is biased against gerotor unit 232 by a snap ring 238. Snap ring 238 is set in a beveled groove 239 that is formed into a wall of pump housing 231. The angled design of beveled groove 239 applies a force to snap ring 238 to bias snap ring 238 against cover 236.

Gerotor unit 232 is a positive displacement pump that draws in lubricant from lubricant sump 210 and pumps the lubricant to filter 240. Aircraft often operate in a wide range of temperatures. As a result, gearbox 160 must be operational at temperatures as low as −40° F. and up to and 250° F. As temperatures decrease, the viscosity of the lubricant in gearbox 160 increases. As viscosity increases, the pressure within gerotor unit 232 also increases and it becomes more difficult for gerotor unit 232 to pump the lubricant through gearbox 160. In some cases, high pressures can lead to failures. For example, high pressures in gerotor unit 232 result in additional pressure being placed upon cover 236 by gerotor unit 232. If the pressure becomes high enough, snap ring 238 and/or beveled groove 239 can fail. If such a failure were to occur, absent protective measures, cover 236 and gerotor unit 232 may no longer be restrained within oil pump receiving bore 300 and could fall into gearbox 160. If any components from oil pump 230 were to fall into gearbox 160, gearbox 160 could fail catastrophically.

To prevent cover 236 and gerotor unit 232 from falling into gearbox 160 in the event of a failure, oil pump receiving bore 300 includes a lip 306. Lip 306 extends radially inward from the wall of oil pump receiving bore 300 and reduces a diameter of an opening 307 of oil pump receiving bore 300. Lip 306 acts as a failsafe to stop cover 236 and gerotor unit 232 from falling into gearbox 160 in the event of a failure of snap ring 238 and/or beveled groove 239.

The diameter of opening 307 is less than a diameter of an opening 308 of oil pump receiving bore 300. If a failure occurs, cover 236 and pump 230 are prevented from entering the interior of gearbox 160 by lip 306 as the diameters of pump 230 and cover 236 are larger than the diameter of opening 307. In a typical aspect, lip 306 is integrally formed as a part of oil pump receiving bore 300 (e.g., cast or machined as one part). In some aspects, lip 306 is a separate piece that is connected to an edge of oil pump receiving bore 300. Prior art gearboxes do not include lip 306 and are vulnerable to damage from cover 236 and/or gerotor unit 232 in the event of a failure of snap ring 238 and/or beveled groove 239.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed aspect, the terms "substantially," "approximately," "generally," and "about" may be substituted with "within [a percentage] of" what is specified, where the percentage includes 0.1, 1, 5, and 10 percent.

The foregoing outlines features of several aspects so that those skilled in the art may better understand the aspects of the disclosure. Those skilled in the art should appreciate that they may readily use the disclosure as a basis for designing or modifying other processes and structures for carrying out the same purposes and/or achieving the same advantages of the aspects introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:
1. An oil pump system, the oil pump system comprising:
a gearbox having formed therein an oil pump receiving bore, the oil pump receiving bore having a first opening having a first diameter and a second opening having a second diameter smaller than the first diameter, wherein the first opening and the second opening are coaxial;
an oil pump comprising a pump housing positioned within the oil pump receiving bore;
a pump shaft extending from the oil pump through the second opening to a gearbox shaft; and an outer diameter of the oil pump nearest the second opening is greater than the second diameter.

2. The oil pump system of claim 1, wherein:
the oil pump comprises a gerotor and a cover housed by the pump housing; and
the pump housing comprises a snap ring positioned in a beveled groove formed into a wall of the pump housing.

3. The oil pump system of claim 2, wherein the snap ring is biased against the cover by the beveled groove.

4. The oil pump system of claim 2, wherein the oil pump comprises a mounting plate that covers the first opening.

5. The oil pump system of claim 4, wherein the gerotor and the cover are held in contact with one another between the snap ring and the mounting plate.

6. The oil pump system of claim 2, wherein the gerotor is coupled to the pump shaft that extends through the second opening.

7. The oil pump system of claim 1, wherein the second opening is bounded by a lip.

8. The oil pump system of claim 7, wherein the lip is integrally formed with the oil pump receiving bore.

9. The oil pump system of claim 1, wherein the gearbox comprises a gearbox housing defining the oil receiving bore, the first opening, and the second opening.

10. A gearbox system for a rotorcraft, the gearbox system comprising:
a gearbox housing;
an oil pump receiving bore formed into the gearbox housing and having formed therein a first opening having a first diameter and a second opening;
the second opening bounded by a lip that extends radially inward, the second opening having a second diameter that is smaller than the first diameter;
an oil pump comprising a pump housing, a gerotor, and a cover positioned within the oil pump receiving bore, wherein an outer diameter of the oil pump nearest the second opening is greater than the second diameter;
a pump shaft coupled to the gerotor and extending through the second opening; and
a mounting plate connected to the gearbox housing and closing the first opening.

11. The gearbox system of claim 10, wherein the pump housing comprises a snap ring positioned in a beveled groove formed into a wall inside of the pump housing.

12. The gearbox system of claim 11, wherein the snap ring is biased against the cover.

13. The gearbox system of claim 11, wherein the gerotor and the cover are held in contact with one another between the snap ring and the mounting plate.

14. The gearbox system of claim 10, wherein the lip is integrally formed with the oil pump receiving bore.

15. The gearbox system of claim 10, further comprising an oil inlet in communication between an oil sump and the oil pump; and
an oil outlet in communication with the oil pump and lubrication jets.

16. A method of installing an oil pump into a rotorcraft gearbox, the method comprising:
inserting a first end of an oil pump into a first opening of an oil pump receiving bore of the rotorcraft gearbox, the first opening having a first diameter, wherein the oil pump comprises a cover and gerotor housed by a pump housing, a pump shaft coupled to the gerotor and extending away from the first end, and a mounting plate opposite from the first end;
positioning the first end of the oil pump adjacent a second opening of the oil pump receiving bore with the pump housing inside of the oil pump receiving bore and the pump shaft extending through the second opening, the second opening having a second diameter that is smaller than the first diameter and an outside diameter of the first end; and
securing the mounting plate to the rotorcraft gearbox.

17. The method of claim 16, wherein the second opening is bounded by a lip that extends radially inward.

18. The method of claim 16, wherein the oil pump further comprises a snap ring disposed in a groove inside of the pump housing adjacent the first end.

19. The method of claim 18, wherein the gerotor and the cover are held in contact with one another between the snap ring and the mounting plate.

20. The method of claim 19, wherein the gerotor is coupled to a shaft that extends through the second opening.

* * * * *